T. C. SMITH.
POLE DERRICK.
APPLICATION FILED MAY 27, 1918.

1,372,838.

Patented Mar. 29, 1921.
3 SHEETS—SHEET 1.

INVENTOR.
T. C. Smith
BY G. E. Folk
ATTORNEY

T. C. SMITH.
POLE DERRICK.
APPLICATION FILED MAY 27, 1918.

1,372,838.

Patented Mar. 29, 1921.
3 SHEETS—SHEET 2.

INVENTOR.
T. C. Smith
BY G. E. Folk
ATTORNEY

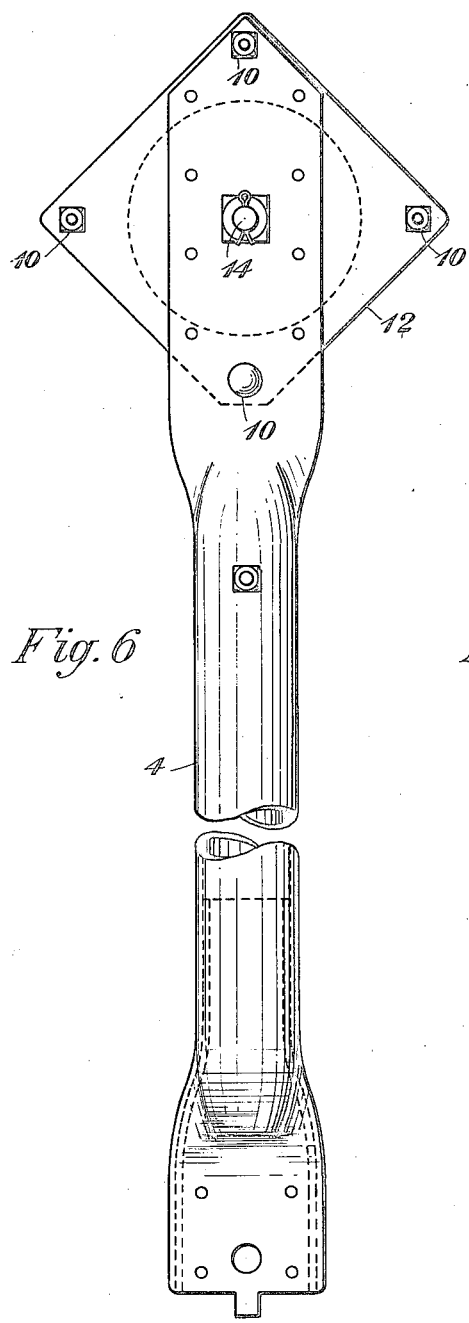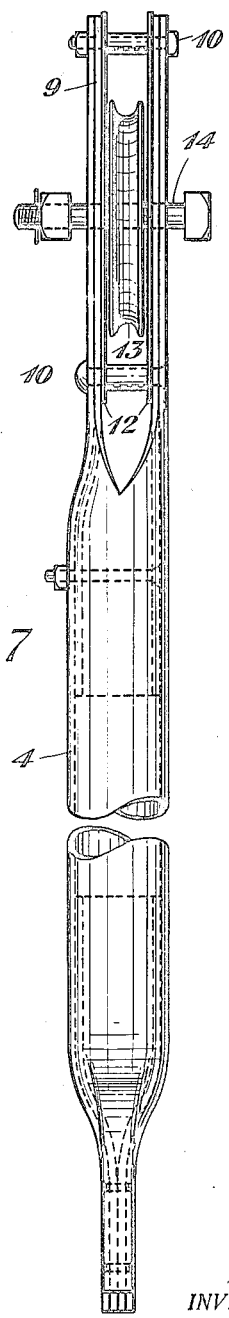

UNITED STATES PATENT OFFICE.

TEMPLE C. SMITH, OF EAST ORANGE, NEW JERSEY, ASSIGNOR TO AMERICAN TELEPHONE AND TELEGRAPH COMPANY, A CORPORATION OF NEW YORK.

POLE-DERRICK.

1,372,838. Specification of Letters Patent. Patented Mar. 29, 1921.

Application filed May 27, 1918. Serial No. 236,848.

*To all whom it may concern:*

Be it known that I, TEMPLE C. SMITH, residing at East Orange, in the county of Essex and State of New Jersey, have invented certain Improvements in Pole-Derricks, of which the following is a specification.

This invention relates to portable hoisting mechanism, and is adapted to the purpose of erecting or removing telephone, telegraph or other poles and the like.

One of the objects of the invention is the provision of a derrick which is comparatively light in weight, though strong enough in design to easily and expeditiously raise or lower poles used in telephone or telegraph line construction or other work of this character.

Another object of the invention is the provision of an apparatus of this nature which is capable, on account of its compactness, of being carried on a truck and is adapted to be mounted and operated thereon with negligible injury to said truck.

The invention further provides a pole derrick which may be easily and quickly assembled and disassembled with a minimum amount of labor. Another object of the invention provides for the manufacture of the device from commercial material which is readily obtainable. Other and further objects of the invention will appear hereinafter.

Figure 1:
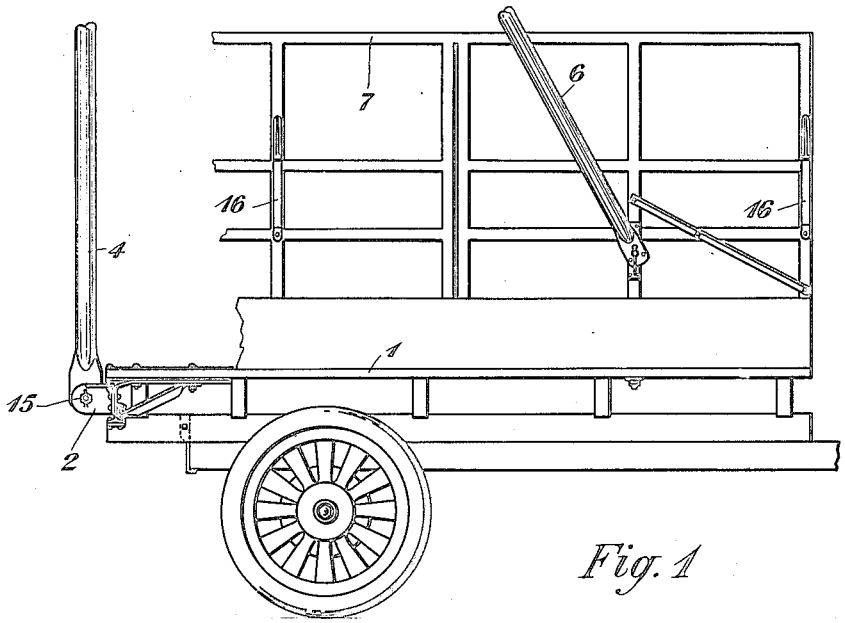
Figure 2:
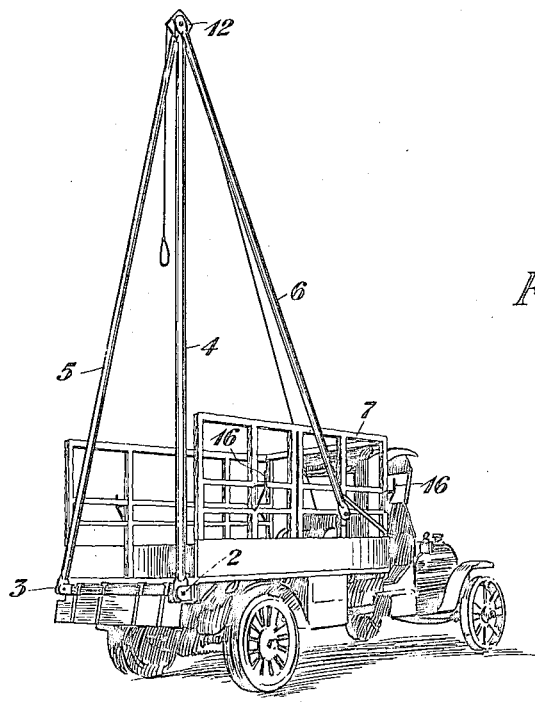
Figures 4, 5:
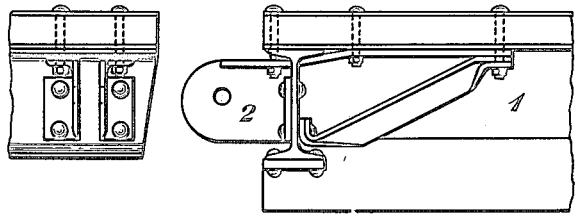
Figure 3:
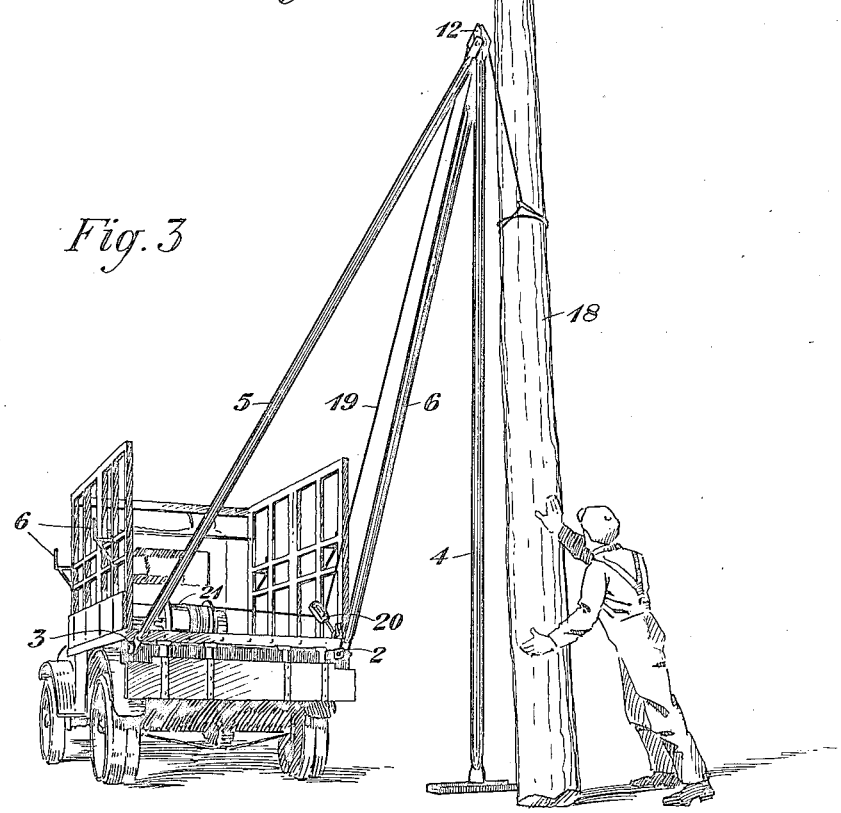

In the drawing forming part of this specification, in which like characters designate like parts throughout, Figure 1 is a side elevation of the device mounted on a wheeled platform; Fig. 2 is a perspective view of the device showing the derrick supported on the truck; Fig. 3 is a perspective view of a truck having a derrick mounted thereon, one of the members of which is supported on the ground, and shown in the act of raising a pole; Figs. 4 and 5 are detailed views of the end and side elevations, respectively, of supporting members carried on the rear of the truck, and Figs. 6 and 7 are side and end elevations of the vertical member which comprises one of the legs of the derrick.

The invention may be now more fully understood from the following description when taken in connection with the accompanying drawings, in which is illustrated a preferred form of the device. In the drawings, 1 represents such parts of a wheeled platform, truck body or automobile chassis as are necessary to be illustrated in connection with the apparatus. Secured to the rear end of the truck in any strong and suitable manner are two bracket joints or supporting means 2 and 3. A vertical member 4 and a bracing member 5, forming two legs of a tripod derrick, are hinged to the supporting means 2 and 3 by bolts 15. A third leg or bracing member 6 of the derrick is bolted or otherwise secured at its lower extremity to the framework 7 of the truck 1. The members 4, 5 and 6, comprising the tripod derrick may be manufactured from any suitable commercial pipe or tubing. In the operation of the derrick the vertical member 4 is subjected to more strain than either of the other members and is therefore preferably of heavier construction. At is upper extremity the vertical member 4 is reinforced for a suitable distance by a drive fit pipe 9. After the reinforcing pipe 9 is in place, the upper extremity of the vertical member 4 is split or cut away to form a bifurcated portion. Each of the forks comprising the bifurcated portion are flattened and at their tops are chamfered. Situated within the bifurcated portion, and secured by means of bolts 10, is a block 12 containing a sheave 13. The sheave 13 is journaled on a threaded spindle 14, which passes through apertures in the bifurcated portion.

Both extremities of the bracing members, 5 and 6 and also the extremities of the vertical member 4 are reinforced in any suitable manner, as, for example, by pipe, driven into the ends of said members. After the pipe is driven a suitable distance within the members, said extremities are flattened and apertures are provided in the same for inserting securing means such as bolts. The vertical member 4 and bracing members 5 and 6 are secured together at their upper extremities by means of the threaded spindle 14, which is inserted through coinciding apertures in said members, and kept in place by a nut threaded on the spindle. The threaded spindle also functions as a journal for the sheave 13, as previously pointed out.

A rope 19 passes over the sheave 13 and pulley-block 20 and is wound upon the drum 21, located in the forward part of the truck 1. The drum 21 is adapted to be operated by any desired power. The pulley-block 20 and vertical member 4 are preferably situated at the same corner of the truck 1. The three members 4, 5, and 6, which comprise the tripod derrick, are preferably carried, when not in use, upon brackets 16 secured to the framework 7 on the side of the truck 1.

When it is desired to erect a pole, the rear end of the truck is located near the hole where the pole is to be set, and the parts of the derrick are taken down from their positions on the brackets 16 and assembled in the rear of the truck and set up in operative position in the following manner:

The vertical member 4 and bracing member 5 are fastened by means of bolts 15 to the supporting members 2 and 3 on the rear platform of the truck 1. The derrick is then lifted slightly above, horizontal, and by means of a rope 19 passing over the sheave 13 and having one end temporarily made fast to the bed of the truck 1, and the derrick is thus raised to an upright position through the agency of drum 21. The bracing member 6 is then bolted to the framework 7 of the truck 1, and the derrick is ready for operation. To set the pole 18 in position, the rope 19 is attached to said pole slightly above its center of gravity and at such distance from the butt of the pole as to permit raising the pole clear of the ground. The rope 19 is now pulled over the sheave 13 and pulley-block 20 and wound upon the drum by any desired power. This operation is continued until the butt is clear of the ground and the pole is in an upright position. It is then swung into the desired position and lowered in the hole where it is to be set.

It sometimes happens that the truck cannot be located in close proximity to the hole into which it is desired to set the pole on account of ditches or other obstructions. In cases of this character, where there is an appreciable intervening space between the truck and the place the pole is to be set, the vertical member 4 may be supported in any suitable manner upon the ground in the rear of the truck 1, and the bracing member 5 being allowed to extend rearwardly from the truck so that the bracing member 6 may be secured to the supporting means 2, as shown in Fig. 3. It will thus be seen that the vertical member 4 may be interchangeably supported on the pivot member 2 or on the ground, and the bracing member 6 interchangeably supported on the framework 7 of the truck or on the member 2. The pole may now be placed in position in a manner similar to that already described. After the pole is placed in the desired position, the rope 19 is loosened and taken off the pole and the derrick is again ready to be operated or to be disassembled and stowed for transportation.

It will be seen that by means of this structure a large proportion of the weight of the object which is to be hoisted is always carried directly by the upright member 4, regardless of whether said upright member rests upon the ground or is secured to the body of the truck.

From the foregoing, it is thought that the construction, operation and many advantages of the herein described invention will be apparent to those skilled in the art, without further description and it will be understood that various changes in the size, shape, proportion and minor details of construction may be resorted to without departing from the spirit or sacrificing any of the advantages of the invention.

Having now described my invention, what I desire to secure by Letters-Patent is:

1. In a hoisting device, a base, a derrick supported thereon and comprising a vertical member and two bracing members, the vertical member and one bracing member being interchangeable and said vertical member being adapted in one position to be supported on said base and in another position to be supported on the ground, and one of the bracing members being adapted to be interchangeably supported in different position upon said base.

2. In a hoisting device, a base, a tripod derrick supported thereon and comprising a vertical member and two bracing members, said members being composed of hollow cylindrical pipes with flattened extremities and reinforcing means for said flattened extremities.

3. In a hoisting apparatus, a base, framework provided thereon, supporting means situated at one end and on opposite corners of the base, a vertical member detachably hinged to the supporting means at one corner, a bracing member for the vertical member detachably hinged to the supporting means at the corner opposite that of the vertical member, a second bracing member for the vertical member detachably secured to the framework of the base, a sheave, and a pin functioning as a journal for the sheave and also as a means for detachably securing the vertical member and two bracing members together.

4. In a hoisting apparatus, a base, framework provided on said base, a pair of supporting brackets fixed to said base at one end and at opposite corners thereof, a vertical member hinged to one of said supporting brackets, a bracing member for said vertical member hinged to the other supporting bracket, a second bracing member for the vertical member secured to said framework, a bifurcated portion provided in said vertical member at its upper extremity, reinforcing plates for said bifurcated portion, a sheave mounted within said bifurcated portion and reinforcing plates, and a pin functioning as a journal for said sheave and for securing the two bracing members to said vertical member.

5. In a hoisting apparatus, a base, framework provided on said base, a pair of supporting brackets each fixed to said base at one end and at opposite corners thereof, a vertical member hinged to one of said supporting brackets, said vertical member being adapted to be interchangeably supported on the ground in the rear of said base, a bracing member for the vertical member hinged to the other supporting bracket, a second bracing member for the vertical member interchangeably mounted on said framework and on the bracket for the vertical member when said member is supported on the ground, a bifurcated portion provided in said vertical member at its upper extremity, a sheave mounted therein, and a pin functioning as a journal for said sheave and for securing the two bracing members to said vertical member.

In testimony whereof, I have signed my name to this specification this 24th day of May, 1918.

TEMPLE C. SMITH.